United States Patent
Suh et al.

(10) Patent No.: US 10,079,100 B2
(45) Date of Patent: Sep. 18, 2018

(54) CAPACITOR AND METHOD OF MANUFACTURING THE SAME

(71) Applicant: Research & Business Foundation Sungkyunkwan University, Suwon-si (KR)

(72) Inventors: Su-jeong Suh, Suwon-si (KR); Jin-ha Shin, Siheung-si (KR); Chang-hyoung Lee, Gyeongsan-si (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 132 days.

(21) Appl. No.: 14/865,419

(22) Filed: Sep. 25, 2015

(65) Prior Publication Data

US 2016/0093436 A1 Mar. 31, 2016

(30) Foreign Application Priority Data

Sep. 25, 2014 (KR) ........................ 10-2014-0128368

(51) Int. Cl.
| | | |
|---|---|---|
| *H01G 4/30* | (2006.01) | |
| *H01G 9/00* | (2006.01) | |
| *H01G 9/07* | (2006.01) | |
| *H01G 9/045* | (2006.01) | |
| *H01G 9/055* | (2006.01) | |
| *H01G 9/048* | (2006.01) | |

(52) U.S. Cl.
CPC ............. *H01G 4/30* (2013.01); *H01G 9/0032* (2013.01); *H01G 9/045* (2013.01); *H01G 9/055* (2013.01); *H01G 9/07* (2013.01); *H01G 9/048* (2013.01)

(58) Field of Classification Search
CPC ........ H01G 4/30; H01G 9/0032; H01G 9/045; H01G 9/055; H01G 9/07; H01G 9/048
USPC ........................................................ 361/312
See application file for complete search history.

(56) References Cited

U.S. PATENT DOCUMENTS

| | | | |
|---|---|---|---|
| 5,141,603 A | 8/1992 | Dickey et al. | |
| 7,836,567 B2* | 11/2010 | Osaka ...................... | H01G 4/33 29/25.41 |
| 2013/0314845 A1* | 11/2013 | Chacko .................... | H01G 9/04 361/502 |
| 2014/0009866 A1* | 1/2014 | Masuda ................. | H01G 4/005 361/306.1 |

(Continued)

FOREIGN PATENT DOCUMENTS

| | | |
|---|---|---|
| JP | 2008-085091 A | 4/2008 |
| JP | 2008-294319 A | 12/2008 |

(Continued)

OTHER PUBLICATIONS

Kim Myoung Won, "Dielectric Properties of Plasma Treated Pore Alumina", Bulletin of the Natural Sciences, 2010, vol. 24. 2010. 12 (29-33), Chungbuk National University, Chungbuk, Republic of Korea.

*Primary Examiner* — Michael P McFadden
(74) *Attorney, Agent, or Firm* — NSIP Law

(57) ABSTRACT

Provided is a capacitor, which includes a first electrode including aluminum, a second electrode facing the first electrode, and a first dielectric layer interposed between the first electrode and the second electrode, including aluminum oxide, and having multiple pores defined in a surface of the first dielectric layer in contact with the second electrode.

20 Claims, 6 Drawing Sheets

(56) References Cited

U.S. PATENT DOCUMENTS

2014/0160624 A1* 6/2014 McConnell ............ H01G 4/38
361/301.4

FOREIGN PATENT DOCUMENTS

JP 2013-258224 A 12/2013
KR 100779388 B1 * 11/2007

* cited by examiner

CAPACITOR AND METHOD OF MANUFACTURING THE SAME

CROSS-REFERENCE TO RELATED APPLICATION

This application claims priority to and the benefit of Korean Patent Application No. 10-2014-0128368, filed on Sep. 25, 2014, in the Korean Intellectual Property Office, the disclosure of which is incorporated herein by reference in its entirety for all purposes.

BACKGROUND

1. Field

The following description relates to a capacitor and a method of manufacturing the same.

2. Discussion of Related Art

While an aluminum electrolytic capacitor is generally used in various fields due to a large charge capacity relative to size, it has low stability at higher temperatures and higher pressures. Recently, to compensate for the disadvantages described above, a solid aluminum capacitor having an enhanced stability to temperature and pressure is generally used.

The solid aluminum capacitor includes a porous dielectric layer in which aluminum is anodized. The dielectric layer may be formed by a hydrating process, an anodizing process, and a thermal treatment. However, in an actual manufacturing process, while the thickness of the dielectric layer on a side wall of the porous structure may be increased, the thickness of the dielectric layer on a bottom surface connected with the side walls to form a pore, however, is not substantially increased but maintained at a relatively small thickness, even if a reaction time has been increased, and thus it is difficult to form a thick dielectric layer. Accordingly, a solid aluminum capacitor has a low operating voltage.

In addition, since the dielectric layer is formed of ceramic alumina and is brittle, the dielectric layer is easily broken and difficult to be handled, and generally requires both pre-processing and post-processing for the anodizing process, and thus a processing cost is high.

SUMMARY

The present description is directed to providing a capacitor including a dielectric layer having a reduced brittleness and having a higher operating voltage.

The present description is directed to providing a method of manufacturing a capacitor including a dielectric layer having a high internal voltage without pre-processing and post-processing for the anodizing process.

In one aspect, a capacitor includes a first electrode including aluminum, a second electrode facing the first electrode, and a first dielectric layer interposed between the first electrode and the second electrode, including an aluminum oxide, and having a plurality of pores defined in a surface of the first dielectric layer in contact with the second electrode.

In one aspect, the first dielectric layer may include a dense layer in contact with the first electrode and a porous layer disposed on the second electrode and including the pores, and a ratio of a total thickness of the first dielectric layer and a thickness of the dense layer may be in a range of about 1:0.05 to about 1:0.15.

A surface of the first electrode in which the first dielectric layer is formed may have a concavo-convex structure.

The capacitor may further include a third electrode facing the first electrode to dispose the first electrode between the third electrode and the second electrode, and a second dielectric layer interposed between the first electrode and the third electrode, including aluminum oxide and having multiple pores in a surface in contact with the third electrode.

Each surface of the first electrode may have a concavo-convex structure.

The first and third electrodes and the first and second dielectric layers form one unit structure, and the capacitor may have a structure in which at least two unit structures are connected by an adhesive layer.

The capacitor may further include a second dielectric layer disposed on an opposite surface of the first electrode, including aluminum oxide, and having multiple pores in its surface, and the first and second electrodes and the first and second dielectric layers may form one unit structure. Here, at least two unit structures are disposed on both surfaces of the electrode layer, and the capacitor may have a stacked structure in which pores of the first and second dielectric layers are in contact with the electrode layer.

The capacitor may further include a third electrode facing the second electrode to interpose the second electrode between the third electrode and the first electrode, and a second dielectric layer interposed between the second electrode and the third electrode, including aluminum oxide, and having multiple pores in a surface in contact with the third electrode.

In an exemplary method of manufacturing a capacitor, an aluminum film is anodized to form a first oxide film having multiple pores in its surface (first anodizing process), the aluminum film having the first oxide film is again anodized to form a first dielectric layer in which a part of each pore of the first oxide film is filled with aluminum oxide (second anodizing process), and a metal layer is formed on the first dielectric layer.

In another aspect, the first oxide film includes a first porous layer including pores and a first dense layer having a first thickness connected with the first porous layer, and the first dielectric layer may include a second porous layer including smaller pores than the first porous layer and a second dense layer connected with the second porous layer and having a second thickness larger than the first thickness.

A size of the pores of the first dielectric layer may be in a range of about 20 to about 90% of the size of the pores of the first oxide film.

The first oxide film may be formed by anodizing with an electrolyte solution such as phosphoric acid, sulfuric acid and/or oxalic acid.

The first dielectric layer may be formed by anodizing with an electrolyte solution such as citric acid and/or boric acid.

Before forming the first oxide film, a concavo-convex structure may be formed in a surface of the aluminum film.

The metal layer may be anodized to form a second oxide film having multiple pores in its surface (first anodizing process). The metal layer having the second oxide film may be anodized to form a second dielectric layer in which a part of each pore of the second oxide film is filled with aluminum oxide (second anodizing process), and an electrode may be formed on the second dielectric layer.

In the formation of the first oxide film and the formation of the first dielectric layer, the oxide film and the dielectric layer may be formed on both surfaces of the aluminum film by being dipped in an electrolyte solution.

The dielectric layer and the first electrode may be directly coupled together or formed of one piece without adhesive therebetween.

The capacitor may further include a base substrate including silicon and being coupled to the first electrode with a titanium layer and a silica layer.

In another aspect a method of manufacturing a capacitor includes forming a first electrode. The first electrode includes aluminum. A first electrolyte and voltage are selectively applied to the first electrode to form an oxide layer defining a plurality of pores and partitions thereon in alternating relation. A second electrolyte and voltage are selectively applied to the portion of the first electrode to thicken the oxide layer thereof according to a predetermined electrical characteristic for the capacitor and a second electrode is applied to be in contact with the partitions.

The method of manufacturing a capacitor may further include adaptively adjusting a voltage or a current or a temperature or an application time of the second electrolyte, or a combination thereof to establish a predetermined thickness of a bottom wall of the plurality of pores.

Other features and aspects will be apparent from the following detailed description, the drawings, and the claims.

Figure 1:
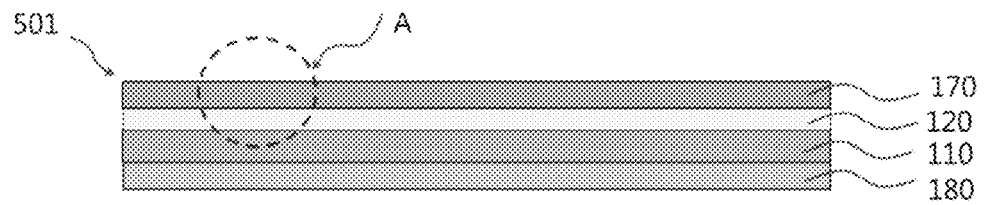
FIG. 1 is a cross-sectional view of an exemplary capacitor.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Unless indicated otherwise, a statement that a first layer is "on" a second layer or a substrate is to be interpreted as covering both a case where the first layer directly contacts the second layer or the substrate, and a case where one or more other layers are disposed between the first layer and the second layer or the substrate.

The spatially-relative expressions such as "below", "beneath", "lower", "above", "upper", and the like may be used to conveniently describe relationships of one device or elements with other devices or among elements. The spatially-relative expressions should be understood as encompassing the direction illustrated in the drawings, added with other directions of the device in use or operation. Further, the device may be oriented to other directions and accordingly, the interpretation of the spatially-relative expressions is based on the orientation.

The terms "first or second" may be used to describe various components, but the components should not be limited by the terms. The terms are only used to distinguish one component from another one. For example, a first component may be denoted as a second component, and similarly a second component may also be denoted as a first component without departing from the scope of the present invention.

The terms used herein are used to only explain specific examples and not to limit the present invention. A singular form is intended to include a plural form, unless the context clearly indicates otherwise. The term "include", "includes", "has", or "have" used herein indicates that a characteristic or a component disclosed in the specification is present, but does not necessarily indicate that one or other characteristics or components are not present or added.

Unless defined otherwise, all terms used herein including technological or scientific terms have the same meaning as generally understood by those of ordinary skill in the art. It should be understood that the same terms as defined in the dictionaries generally used have meanings corresponding to those in the context of a related art, and unless clearly defined in the present invention, they are not to be understood in an ideal or excessively formal sense.

Figure 2:
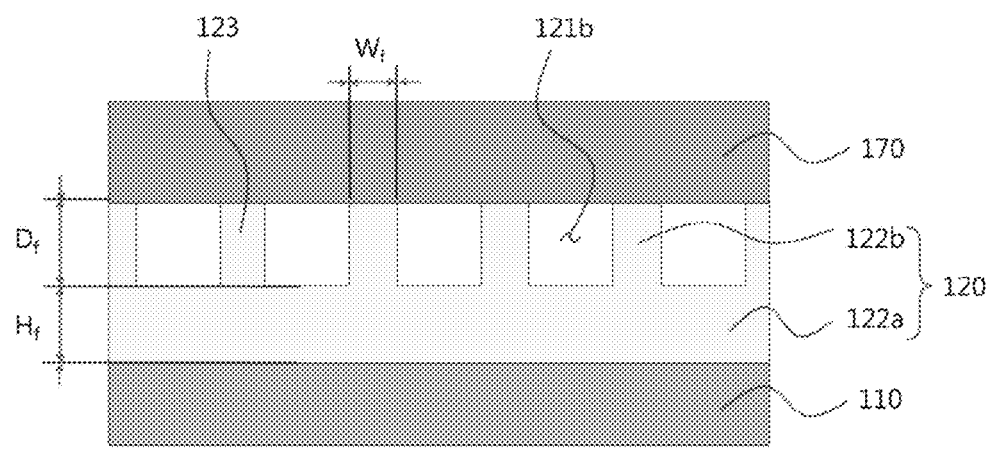
FIG. 2 is an enlarged cross-sectional view of part A of FIG. 1.

FIG. 1 is a cross-sectional view of an exemplary capacitor, and FIG. 2 is an enlarged cross-sectional view of part A of FIG. 1.

Referring to FIGS. 1 and 2, a capacitor 501 includes a first electrode 110, a dielectric layer 120 and a second electrode 170. The first electrode 110, the dielectric layer 120 and the second electrode 170 may be formed on a base substrate 180. The base substrate 180 may be, for example, a silicon wafer, a gallium arsenide wafer, or other compound III-V or II-VI materials suitable as a substrate. A silica layer may be formed on the wafer substrate, and a titanium layer enhancing an adhesive strength to the first electrode 110 may be further formed on the silica layer.

The first electrode 110 includes aluminum. For example, the first electrode 110 may be formed of high purity aluminum or an aluminum alloy. The first electrode 110 and the dielectric layer 120 are formed by anodizing at least a portion of the aluminum layer formed of high purity aluminum or an aluminum alloy. A part of the aluminum layer is converted into the dielectric layer 120 through the anodizing process, and the remainder thereof forms the first electrode 110. The portion may include a laminar upper portion on a proximate side to the second electrode 170.

The dielectric layer 120 is disposed on the first electrode 110 and includes multiple pores 121b formed in a surface of the dielectric layer 120. The multiple pores 121b are formed in a surface of the dielectric layer 120 in contact with the second electrode 170. The dielectric layer 120 is formed of aluminum oxide.

The dielectric layer 120 may be a layer formed by partially anodizing the aluminum layer, and may be structurally divided into a dense layer (substantially devoid of additionally formed pores) 122a and a porous layer 122b. While the dense layer 122a and porous layer 122b are discussed as separate layers, this is merely for clarity and conciseness of disclosure. There may be no distinct separation, but a transition from a porous portion 122b to a less-porous and a relatively more dense portion which is dense layer 122a. Where the pores 121b are defined as U-shaped, the dense layer 122b may be considered as starting at the bottom wall of the pore and continuing down to the first electrode 110. The dense layer 122a is a lower layer directly in contact with the first electrode 110 and substantially entirely covering the first electrode 110. The porous layer 122b is an upper layer disposed on the dense layer 122a, and includes multiple pores 121b and partitions 123 connected with the dense layer 122a. An empty space defined by the partitions 123 in the porous layer 122b forms a pore 121b, and the dense layer 122a corresponds to a bottom of the pore 121b. Since the multiple pores 121b of the porous layer 122b are configured to absorb an external impact, brittleness of the dielectric layer 120 may be minimized and resilience to shock may be improved.

A thickness of the dielectric layer 120 is equal to the sum of a thickness $H_f$ of the dense layer 122a and a depth $D_f$ of the pore 121b. The depth $D_f$ of the pore 121b is substantially the same as a height of the side-wall or partition 123 (used interchangeably herein), that is, a thickness of the porous layer 122b. With respect to the total thickness of the dielectric layer 120, the thickness $H_f$ of the dense layer 122a may be in a range of about 5% to about 100% of the total thickness of the dielectric layer 120. As an example, the thickness $H_f$ of the dense layer 122a may be in a range of about 50% to about 80% of the total thickness of the dielectric layer 120. In the manufacturing process, as the thickness $H_f$ of the dense layer 122a is controlled to be in the range described above, the brittleness of the dielectric layer 120 may be reduced, and an operating voltage may be increased.

The thickness $H_f$ of the dense layer 122a has a greater value than a width $W_f$ of the partition 123. A ratio of the width $W_f$ of the partition 123 and the thickness $H_f$ of the dense layer 122a may be approximately 1:1 to about 1:20.

The second electrode 170 is formed on the dielectric layer 120, and in contact with the partitions 123. The second electrode 170 may be formed of high purity aluminum or an aluminum alloy, or a non-aluminum conductive material, for example, a metal such as nickel, copper or silver, or a conductive polymer.

Figure 3A:
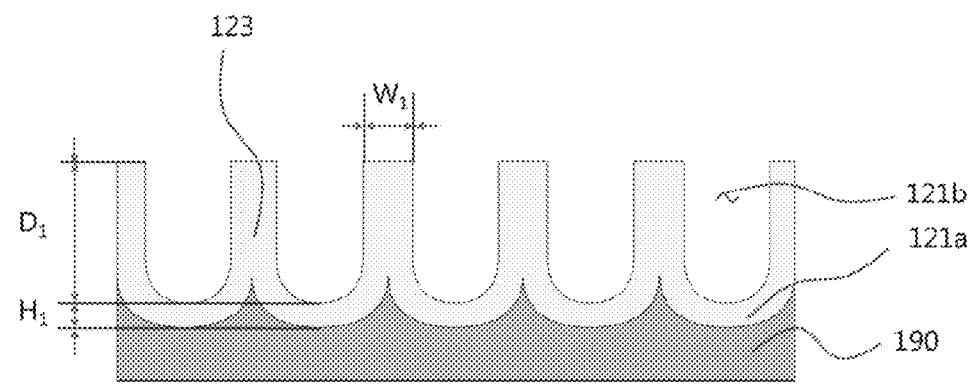
FIGS. 3A and 3B are cross-sectional views illustrating an exemplary method of manufacturing a capacitor shown in FIG. 2.
Figure 3B:
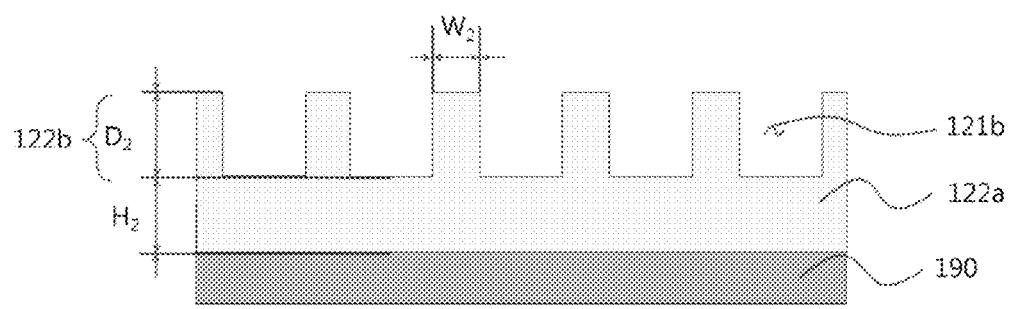

FIGS. 3A and 3B are cross-sectional views illustrating a method of manufacturing an exemplary capacitor shown in FIG. 2.

Referring to FIG. 3A, an aluminum film 190 is prepared, and a first voltage is applied to the aluminum film 190 in a first electrolyte solution to perform a first anodizing process on the aluminum film.

The aluminum film 190 may include high purity aluminum or an aluminum alloy. A surface of the aluminum film 190 is a substantially planarized surface. As an example of the first electrolyte solution, sulfuric acid, phosphoric acid, or oxalic acid may be used.

In the first anodizing process, the first electrolyte solution permeates into the aluminum film 190, thereby forming an oxidized film 121a having multiple pores 121b in its surface. The oxidized film 121a is formed of aluminum oxide by partially oxidizing the aluminum film 190 in the presence of the first electrolyte solution. The oxidized film 121a, at the bottom of the pore 121b, that is, the dense layer, has a first thickness $H_1$. The first thickness $H_1$ of the dense layer may be in a range of approximately 5 to about 15, when the total thickness $D_1$ of the oxidized film 121a is about 100. In addition, the width $W_1$ of the partition 123 of the oxidized film 121a may be approximately 1 to about 5 times larger than the thickness $H_1$ of the dense layer. An absolute thickness of the oxidized film 121a may be adjusted according to the voltage applied in the first anodizing process.

Referring to FIG. 3B, a second anodizing process is performed by applying a second voltage to the aluminum film 190 in which the oxidized film 121a is formed in a second electrolyte solution. As examples of the second electrolyte solution, boric acid or citric acid may be used.

In the second anodizing process, as aluminum atoms dispersing from the aluminum film 190 are oxidized, a pore 121b of the oxidized film 121a is filled with the aluminum oxide from the bottom aluminum film 190 layer, and as a result, the thickness $H_2$ of the dense layer 122a is increased. Accordingly, the first thickness, for example, $H_1$ (as seen in FIG. 3A) of the bottom of the pore 121b of the oxidized film 121a is increased, thereby forming the dense layer 122a having a second thickness $H_2$, and a pore 121b smaller than the pore 121b of the oxidized film 121a. That is, the bottom of the pore 121b of the dielectric layer 120 has a second thickness $H_2$ larger than the first thickness $H_1$. In addition to the dielectric layer 120, a part remaining as the aluminum film 190 becomes the first electrode 110 of the capacitor 501 described in FIG. 1.

Since the aluminum film 190 is anodized again by the second anodizing process, the sum of the second thickness $H_2$ of the dense layer 122a and the depth $D_2$ of the pore 121b may be larger than the sum of the first thickness $H_1$ of the oxidized film 121a and the depth $D_1$ of the pore 121b. In other words, $H_2+D_2>H_1+D_1$ or the total thickness of the anodized dielectric layer 120 is increased. The second thickness $H_2$ is larger than the first thickness $H_1$, and the depth $D_2$ of the pore 121b formed in the dense layer 122a is smaller than the depth $D_1$ of the pore 121b formed in the oxidized film 121a. As an example, the depth $D_2$ of the pore 121b formed in the dense layer 122a may be approximately 20% to approximately 90% of the depth $D_1$ of the pore 121b formed in the oxidized film 121a. A voltage applied to the second anodizing process may be adjusted to make the depth $D_2$ of the pore 121b formed in the dense layer 122a greater than 0 nm Here, a width $W_2$ of a side wall or partition 123 of a porous layer 122b may be substantially the same as or greater than the width $W_1$ of a side wall or partition 123 of the oxidized film 121a.

The dielectric layer 120 is formed by the second anodizing process as described above, and a second electrode 170 is formed on the dielectric layer 120. Accordingly, a capacitor 501 as described in FIGS. 1 and 2 may be manufactured.

As described above, a porous oxidized film 121a may be formed by the first anodizing process, and a thickness of the oxidized film 121a and a thickness of a bottom of the pore 121*b*, is increased by the second anodizing process, thereby forming a relatively thicker bottom of the pore 121*b* of the dielectric layer 120. As the thickness of the bottom, that is, the dense layer 122*a* of the pore 121*b* of the dielectric layer 120 is increased, the dielectric layer 120 includes a porous layer 122*b* including multiple pores 121*bs* and brittleness of the dielectric layer 120 may be reduced, and as a resistance to a high voltage is increased, an operating voltage of the capacitor 501 may be increased.

Figure 4:
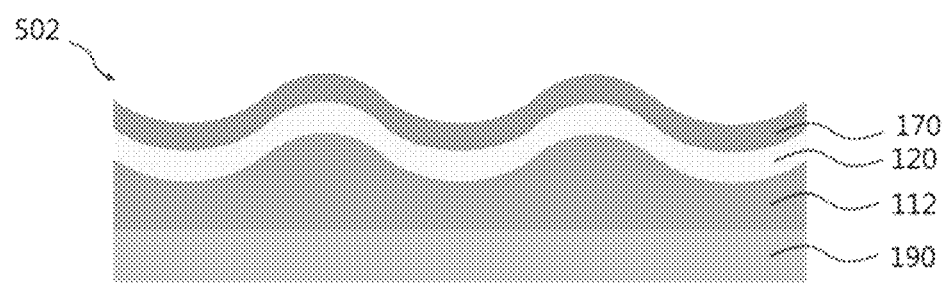
FIG. 4 is a cross-sectional view of another exemplary capacitor.

FIG. 4 is a cross-sectional view of another exemplary capacitor.

Referring to FIG. 4, a capacitor 502 includes a base substrate 180, a first electrode 112, a dielectric layer 120 and a second electrode 170. The capacitor 502 shown in FIG. 4 is substantially the same as the capacitor 501 shown in FIGS. 1 and 2, except that the first electrode 112 has a concavo-convex surface in contact with the dielectric layer 120, and thus repeated detailed description will be omitted.

The surface of the first electrode 112 has a concavo-convex structure, and the dielectric layer 120 and the second electrode 170 are stacked in laminar manner on the first electrode 112. Accordingly, the dielectric layer 120 and the second electrode 170 also have a concavo-convex structure according to a surface shape of the first electrode 112. Since the surface of the first electrode 112 has a concavo-convex structure, a surface area is larger than that of the first electrode 110 having a substantially planarized surface. Therefore, an electrostatic capacity of the capacitor 502 may be increased.

A method of manufacturing the capacitor 502 shown in FIG. 4 is substantially the same as described in FIGS. 3A and 3B, but before a first anodizing process, a concavo-convex structure is formed on a surface of the aluminum film 190. The concavo-convex structure may be formed on a surface of the aluminum film 190 by a physical method such as sanding, polishing or imprinting, or a chemical method such as surface etching.

A process of forming the dielectric layer 120 and the second electrode 170 is substantially the same as described in FIGS. 3A and 3B, and thus repeated detailed description will be omitted.

Figure 5:
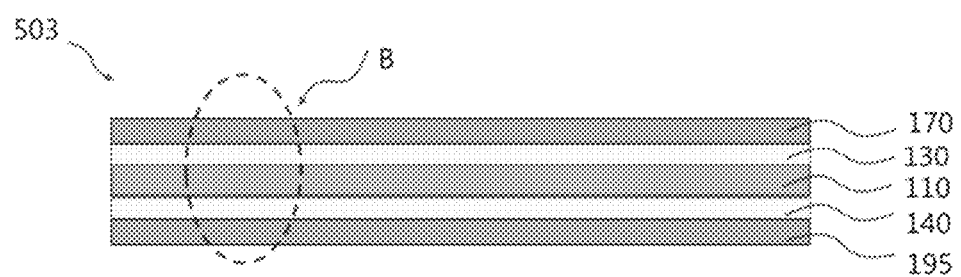
FIG. 5 is a cross-sectional view of another exemplary capacitor.
Figure 6:
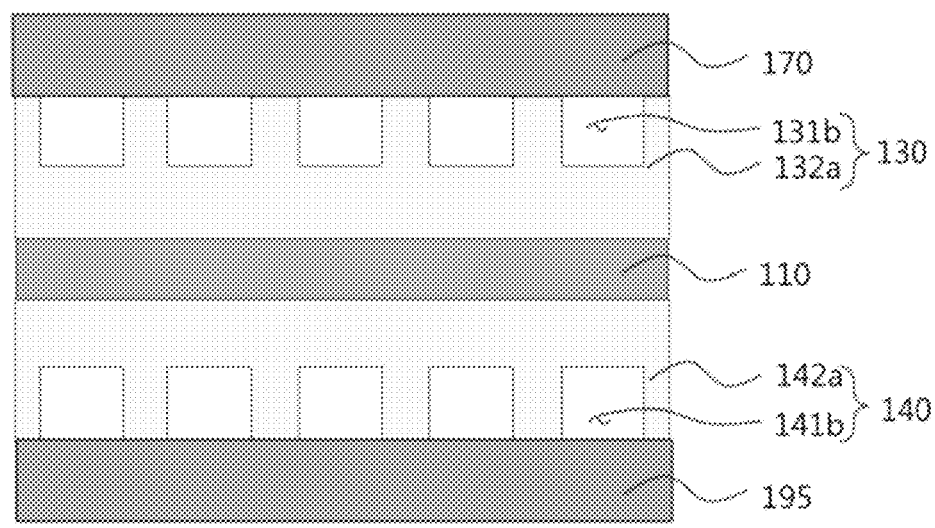
FIG. 6 is an enlarged cross-sectional view of part B of FIG. 5.

FIG. 5 is a cross-sectional view of another exemplary capacitor, and FIG. 6 is an enlarged cross-sectional view of part B of FIG. 5.

Referring to FIGS. 5 and 6, a capacitor 503 includes a first electrode 110, a second electrode 170, a third electrode 195, and two dielectric layers 130 and 140. Hereinafter, a dielectric layer interposed between the first electrode 110 and the second electrode 170 is referred to as a "first dielectric layer 130," and a dielectric layer interposed between the first electrode 110 and the third electrode 195 is referred to a "second dielectric layer 140."

The first dielectric layer 130 is substantially the same as the dielectric layer 120 shown in FIGS. 1 and 2, and the first electrode 110 and the second electrode 170 are substantially the same as described in FIGS. 1 and 2, and therefore repeated detailed description will be omitted. In addition, the second dielectric layer 140 is substantially the same as the first dielectric layer 130, except that it is interposed between the first electrode 110 and the third electrode 195, and thus repeated detailed description will be omitted.

The first dielectric layer 130 is interposed between the first electrode 110 and the second electrode 170, the third electrode 195 faces the first electrode 110, and the first electrode 110 is interposed between the third electrode 195 and the second electrode 170.

A dense layer 132*a* of the first dielectric layer 130 is formed on one surface of the first electrode 110, and a pore 131*b* of the first dielectric layer 130 is in contact with the second electrode 170.

In addition, the dense layer 142*a* of the second dielectric layer 140 is formed on the other surface of the first electrode 110, and a pore 131*b* of the second dielectric layer 140 is in contact with the third electrode 195.

Although not shown in the drawings, the base substrate 180 shown in FIGS. 1 and 2 may be disposed on the second electrode 170 or third electrode 195.

The capacitor 503 shown in FIGS. 5 and 6 described above may have a triple layered structure of aluminum oxide-aluminum-aluminum oxide in which a first dielectric layer 130, a first electrode 110 and a second dielectric layer 140 are sequentially stacked between the second electrode 170 and the third electrode 195, and a thick bottom of the pore 131*b* and 141*b* of each of the first dielectric layer 130 and the second dielectric layer 140, brittleness may be reduced, and the electrostatic capacity of the capacitor 503 may be enhanced.

Referring to FIGS. 6 and 3A, a method of manufacturing the capacitor 503 includes preparing an aluminum film 190, and performing a first anodizing process by dipping the aluminum film 190 in a container containing a first electrolyte solution. Since the first anodizing process is performed while the aluminum film 190 is dipped in the first electrolyte solution, the oxidized film 121*a* shown in FIG. 2A is formed on both surfaces of the aluminum film 190. The first anodizing process is substantially the same as described in FIG. 3A, and thus repeated detailed description will be omitted.

The aluminum film 190 in which the oxidized film 121*a* is formed on both surfaces is dipped in a container containing a second electrolyte solution to perform a second anodizing process. Accordingly, the first dielectric layer 130 and the second dielectric layer 140 are formed on respective side surfaces of the aluminum film 190, and the remaining aluminum film 190 serves as the first electrode 110. The second anodizing process is substantially the same as described in FIG. 3B, and thus repeated detailed description will be omitted.

The capacitor 503 shown in FIGS. 5 and 6 may be manufactured by forming the first and second dielectric layers 130 and 140, and forming the second electrode 170 and the third electrode 195 on the first and second dielectric layers 130 and 140, respectively.

Figure 7:
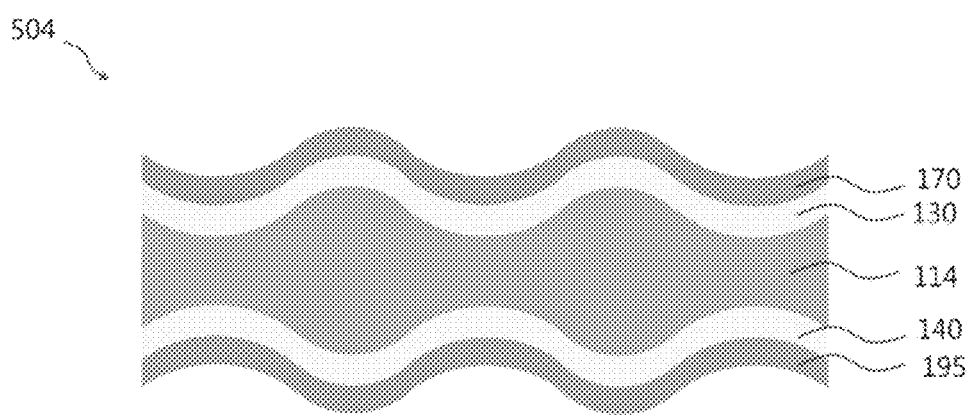
FIGS. 7 and 8 are cross-sectional views of another exemplary capacitor.
Figure 8:
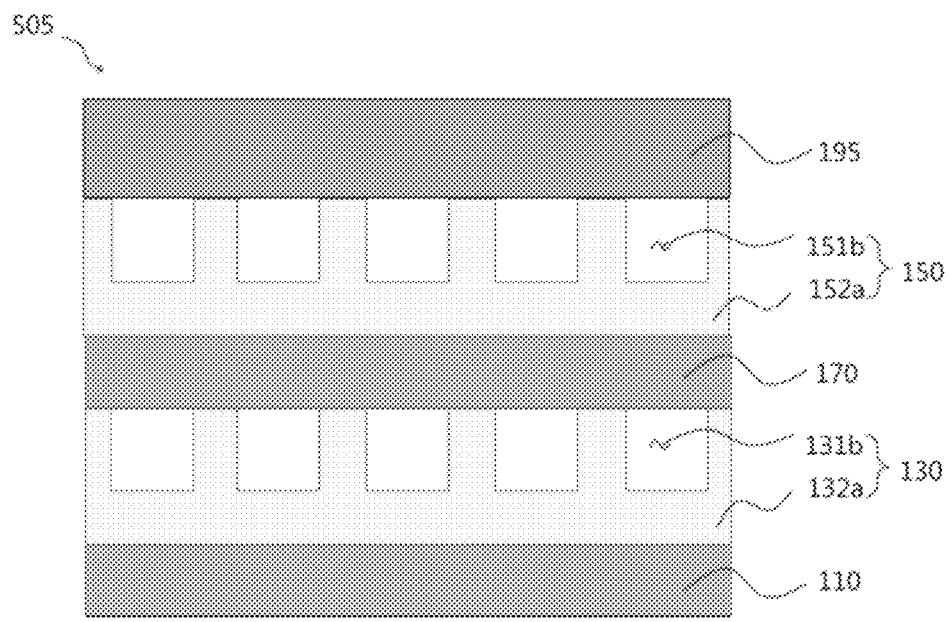

FIGS. 7 and 8 are cross-sectional views of another exemplary capacitor.

Referring to FIG. 7, a capacitor 504 includes a first electrode 114, a second electrode 170, a third electrode 195 and two dielectric layers 130 and 140. The capacitor 504 shown in FIG. 7 is substantially the same as capacitor 503 shown in FIGS. 5 and 6, except that both surfaces of the first electrode 114 have a concavo-convex structure. Therefore, repeated description will be omitted.

Since the first electrode 114 has concavo-convex side surfaces, layers sequentially stacked thereon also have concavo-convex structures according to a surface shape of the first electrode 114. The structure formed by forming the dielectric layers 130 and 140 on the first electrode 114 is formed according to the concavo-convex structure.

As the surface of the first electrode 114 has a concavo-convex structure, a surface area may be increased, and as a stacked structure including two dielectric layers 130 and 140 is formed compared to a single structure capacitor having one dielectric layer, an electrostatic capacity of the capacitor 504 may be increased.

A method of manufacturing the capacitor 504 shown in FIG. 7 is also substantially the same as that shown in FIG. 6, except that before a first anodizing process, a concavo-convex structure is formed on both surfaces of the aluminum film 190, and the aluminum film 190 having the concavo-convex structure is dipped in a container containing the first electrolyte solution. A process of forming the concavo-convex structure is substantially the same as described in FIG. 4, and therefore repeated detailed description will be omitted.

Referring to FIG. 8, a capacitor 505 includes a first electrode 110, a first dielectric layer 130, a second electrode 170, a second dielectric layer 150 and a third electrode 195.

The first electrode 110 and the first dielectric layer 130 are substantially the same as those shown in FIGS. 1 and 2. A dense layer 132a of the first dielectric layer 130 is formed on the first electrode 110, and a pore 131b of the first dielectric layer 130 is in contact with a planarized surface of the second electrode 170.

The second dielectric layer 150 is formed on the second electrode 170. A dense layer 152a of the second dielectric layer 150 is formed on the second electrode 170, and a pore 151b of the second dielectric layer 150 is formed in the second dielectric layer 150 in contact with the third electrode 195.

Figure 9A:
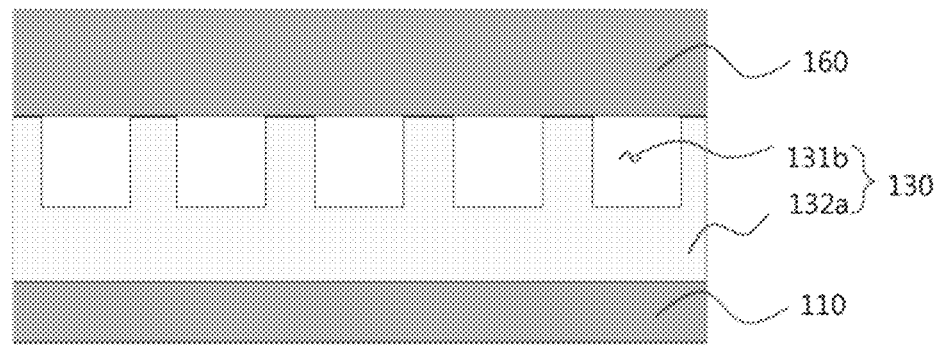
FIGS. 9A and 9B are cross-sectional views illustrating an exemplary method of manufacturing a capacitor illustrated in FIG. 8.
Figure 9B:
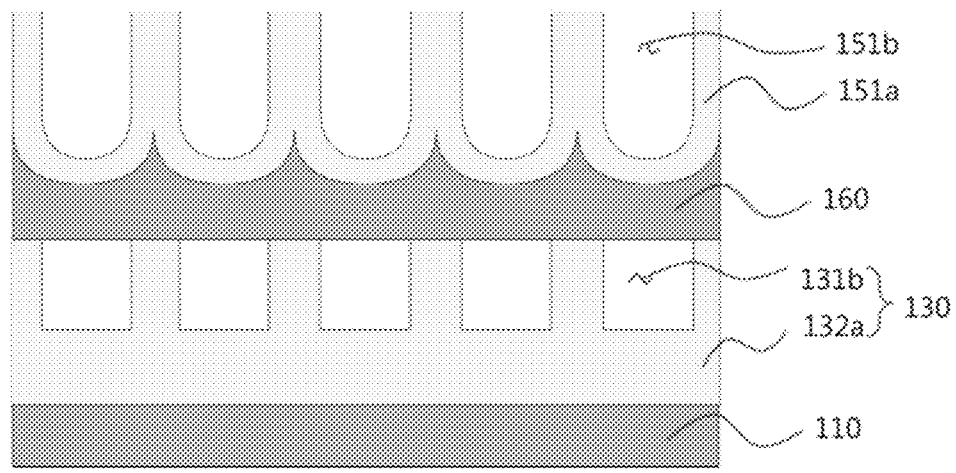

FIGS. 9A and 9B are cross-sectional views illustrating a method of manufacturing a capacitor shown in FIG. 8.

Referring to FIG. 9A, a first electrode 110 and a first dielectric layer 130 are formed, and an electrode layer 160 is formed on the first dielectric layer 130. A method of forming the first electrode 110 and the first dielectric layer 130 is substantially the same as the process of forming the first electrode 110 and the dielectric layer 120 using the aluminum film 190 shown in FIGS. 3A and 3B. As the first dielectric layer 130 is formed by performing first and second anodizing processes on an aluminum film 190, a relatively thick bottom of the pore 131b of the first dielectric layer 130 may be formed.

An electrode layer 160 may be formed of high purity aluminum or an aluminum alloy. The electrode layer 160 may be formed by vacuum depositing aluminum on the first dielectric layer 130. For example, the electrode layer 160 may be formed by sputtering.

Referring to FIG. 9B, a first electrolyte solution is provided to the electrode layer 160 to form an oxidized film 151a having multiple pores 151b. The first electrolyte solution is substantially the same as that described in relation to FIG. 3A. As the first electrolyte solution is provided to the electrode layer 160, a part of the electrode layer 160 is subjected to a first anodizing process, a concave pattern is formed in a surface of the electrode layer 160, thereby forming the oxidized film 151a.

Subsequently, the second dielectric layer 150 having multiple pores 131b is formed by providing a second electrolyte solution to the oxidized film 151a. The second electrolyte solution is substantially the same as that described in relation to FIG. 3B. A relatively large thickness of the oxidized film 151a, that is, a thick bottom of the pore 151b may be formed by performing a second anodizing process by providing the second electrolyte solution to the oxidized film 151a. The electrode layer 160 remaining after being anodized to form the second dielectric layer 150 becomes the second electrode 170 of FIG. 8.

The capacitor 505 shown in FIG. 8 may be manufactured by forming the second dielectric layer 150 and a third electrode 195.

As described above, as multiple pores 121b are formed increasing a thickness of the dense layers 132a and 152a of the first and second dielectric layers 130 and 150, and absorbing an external impact, the brittleness of the first and second dielectric layers 130 and 150 may be reduced, and an operating voltage may be increased. In addition, the capacitor 505 may be enhanced in electrostatic capacity by disposing a triple layered structure of alumina-aluminum-alumina in which a first dielectric layer 130, a second electrode 170 and a second dielectric layer 150 are stacked between the first electrode 110 and the third electrode 195, which are spaced apart from each other.

Figure 10:
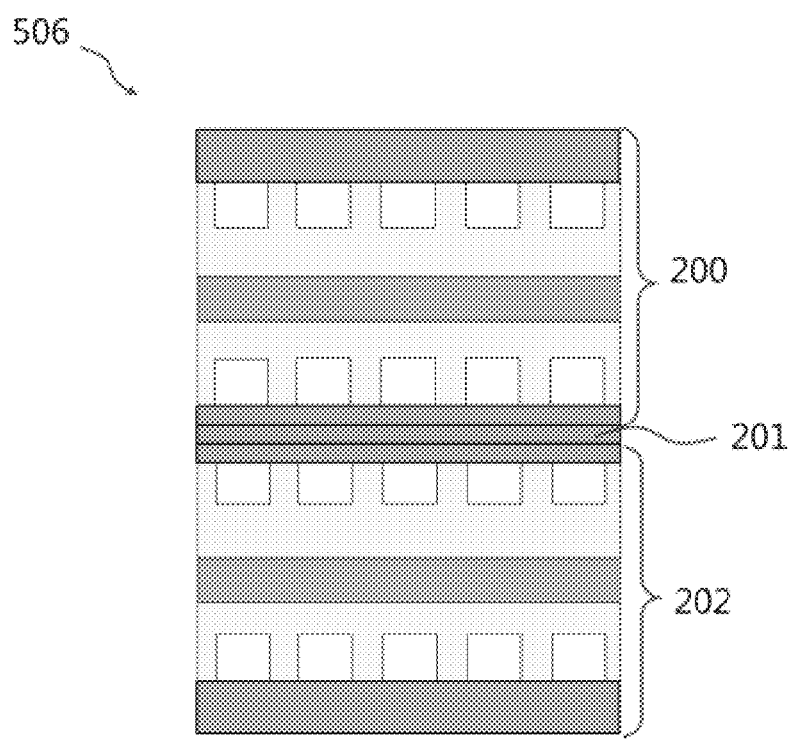
FIG. 10 is a cross-sectional view of another exemplary capacitor.

FIG. 10 is a cross-sectional view of another exemplary capacitor.

Referring to FIG. 10, the capacitor 506 includes two structures 200 and 202.

Each of the first and second structures 200 and 202 are substantially the same as that of the capacitor 503 shown in FIGS. 5 and 6. An adhesive layer 201 is disposed between the first and second structures 200 and 202 to connect the first and second structures 200 and 202. The adhesive layer 201 may include an epoxy- or polyimide-based resin, or other suitable adhesive.

In FIG. 10, an example in which the first and second structures 200 and 202 are connected is shown, but at least three structures may be stacked.

In addition, each of the first and second structures 200 and 202 in FIG. 10 is the same as the structure of the capacitor 503 shown in FIGS. 5 and 6, but the capacitor 504 shown in FIG. 7 and the capacitor 505 shown in FIG. 8 may be connected as unit structures using at least two adhesive layers 201.

In addition, the capacitor 501 shown in FIGS. 1 and 2 or the capacitor 502 shown in FIG. 4 may be connected as unit structures using at least two adhesive layers 201, and at least two unit structures having a different stacked structure among them may be selected and connected using the adhesive layer 201.

Figure 11:
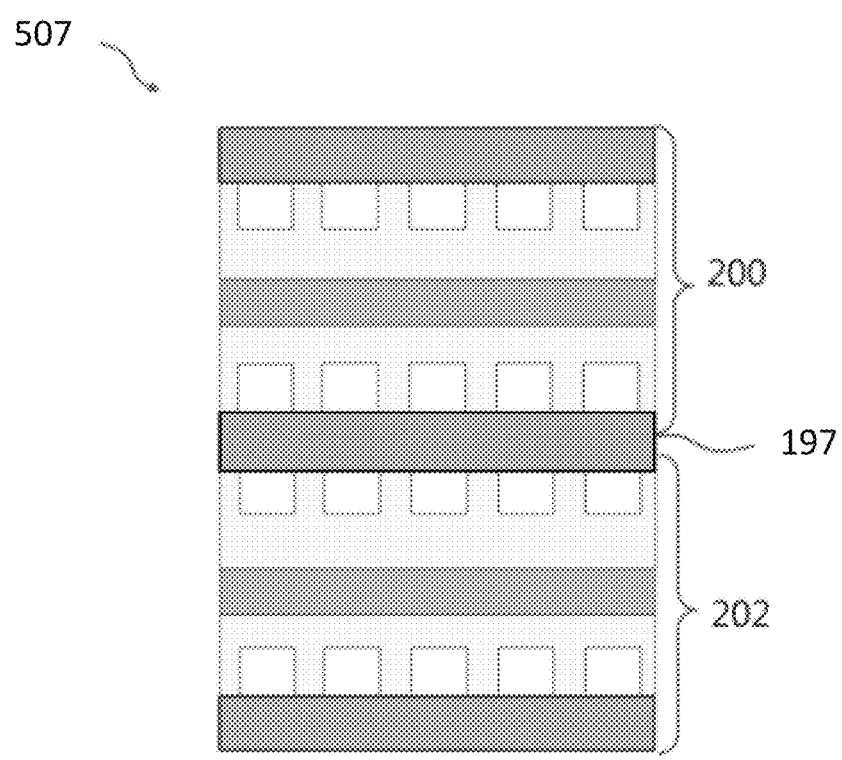
FIG. 11 is a cross-sectional view of another exemplary capacitor.

As shown in FIG. 11, another exemplary capacitor, two unit structures which are formed by omitting a third electrode 195 from the capacitor of FIG. 5 may be connected using a metal layer 197. The metal layer may be formed of a metal paste. That is, a capacitor 507 may be manufactured to have a structure in which two structures of the capacitor of FIG. 5 from which the third electrode 195 is omitted share the metal layer as one electrode.

Manufacture of Exemplary Capacitor and Evaluation of Characteristic

A silicon wafer in which an aluminum layer having a thickness of 1.5 μm and a titanium layer having a thickness of 20 nm are sequentially formed was subjected to a first anodizing process for approximately 13 minutes by applying a voltage of 40 V using 0.3 M oxalic acid as a first electrolyte solution at approximately 5° C.

Subsequently, a second anodizing process was performed by applying voltages of 100, 150, 200, 250 and 300 V with a current of 10 mA/cm$^2$ using 1 wt % citric acid as a second electrolyte solution at approximately 25° C.

Five capacitor samples were prepared by forming an aluminum electrode on a dielectric layer manufactured after the second anodizing process, and electrostatic capacity and insulating strength of each sample were measured. The results are shown in Table 1.

TABLE 1

| Voltage of second anodizing process | Electrostatic capacity (unit: nF) | d (%) | BDV (unit: V) | k | Ratio of total thickness of dielectric layer to thickness of pore bottom (dense layer) |
|---|---|---|---|---|---|
| x | — | — | — | — | 1:0.08 |
| 100 V | 14 | 1.2 | 110 | 8.7 | 1:0.26 |
| 150 V | 14 | 1.1 | 170 | 8.4 | 1:0.36 |
| 200 V | 13 | 1 | 220 | 8.8 | 1:0.50 |
| 250 V | 13 | 0.9 | 270 | 8.0 | 1:0.60 |
| 300 V | 12 | 0.7 | 320 | 8.0 | 1:0.70 |

In Table 1, BDV is a breakdown voltage, and d (%) is a loss rate of the capacitor.

Referring to Table 1, it can be seen that, according to the second anodizing process, a ratio of the thickness of the pore bottom to the total thickness of the dielectric layer is considerably increased from 1:0.08 to 1:0.26 to 1:0.70. That is, it can be seen that the thickness of the pore bottom, that is, the thickness of the dense layer is increased by the second anodizing process, and as the voltage of the second anodizing process is increased, the thickness of the pore bottom is larger.

In addition, it can be seen that as the voltage of the second anodizing process is increased, BDV is increased. That is, it can be seen that as the thickness of the dense layer is increased, brittleness is reduced.

It can be seen that the loss rate d (%) of the capacitor is 1.2% or less.

A dielectric layer including a pore absorbing an external impact and having a thick pore bottom can be formed to reduce brittleness of the dielectric layer and overall brittleness of the capacitor. Since a resistance to a high voltage can be enhanced by the dielectric layer, an operating voltage of the capacitor may be increased.

After a first anodizing process, a second anodizing process can be performed using a second electrolyte solution which is different from a first electrolyte solution used in the first anodizing process, thereby forming a dielectric layer including a pore and having an increased thickness of the pore bottom. A dielectric layer having a stable structure may be formed without pre/post-processing of the first and second anodizing processes.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A capacitor, comprising: a first electrode including aluminum; a second electrode facing the first electrode; and a first dielectric layer interposed between the first electrode and the second electrode, including an aluminum oxide, and having a plurality of pores defined in a surface of the first dielectric layer in contact with the second electrode, wherein the first dielectric layer includes: a dense layer contacting the first electrode on a side facing the second electrode and a porous layer disposed between the dense layer and the second electrode and including the plurality of pores, the porous layer having a density lower than that of the dense layer.

2. The capacitor according to claim 1, wherein a ratio of a total thickness of the first dielectric layer to a thickness of the dense layer is in a range of about 1:0.05 to about 1:1.

3. The capacitor according to claim 1, wherein a surface of the first electrode in which the first dielectric layer is formed has a concavo-convex structure.

4. The capacitor according to claim 1, further comprising: a third electrode facing the first electrode to dispose the first electrode between the second electrode and the third electrode; and a second dielectric layer interposed between the first electrode and the third electrode, including aluminum oxide, and having multiple pores defined in a surface in contact with the third electrode.

5. The capacitor according to claim 4, wherein both surfaces of the first electrode have concavo-convex structures.

6. The capacitor according to claim 4, wherein the first to third electrodes and the first and second dielectric layer form one unit structure, and at least two unit structures are connected by an adhesive layer.

7. The capacitor according to claim 1, further comprising: a second dielectric layer disposed on an opposite surface of the first electrode, including aluminum oxide, and having multiple pores defined in a surface thereof, wherein the first and second electrodes and the first and second dielectric layers form one unit structure, and at least two unit structures are disposed on both sides of an electrode layer.

8. The capacitor according to claim 1, further comprising: a third electrode facing the second electrode to dispose the second electrode between the first electrode and the third electrode; and a second dielectric layer interposed between the second electrode and the third electrode, including aluminum oxide, and having a plurality of pores in a surface in contact with the third electrode.

9. A method of manufacturing a capacitor, comprising: forming a first oxidized film having a plurality of pores in its surface by performing a first anodizing process on an aluminum film; forming a first dielectric layer in which a part of each pore of the first oxidized film is filled with aluminum oxide by performing a second anodizing process on the aluminum film on which the first oxidized film is formed, wherein the first dielectric layer including a dense layer contacting the first electrode on a side facing the second electrode and a porous layer disposed between the dense layer and the second electrode and including the plurality of pores, the porous layer having a density lower than that of the dense layer; and forming a metal layer on the first dielectric layer.

10. The method according to claim 9, wherein the first oxidized film includes a first porous layer having a plurality of pores and a first dense layer having a first thickness, the first dense layer connected with the first porous layer, and the first dielectric layer includes a second porous layer having pores smaller than those of the first porous layer and a second dense layer connected with the second porous layer and having a second thickness larger than the first thickness.

11. The method according to claim 10, wherein a size of each of the pores of the first dielectric layer is in a range of about 20 to about 90% of the size of the pores of the first oxidized film.

12. The method according to claim 9, wherein the forming of the first oxidized film includes anodizing the first oxidized film with at least one electrolyte solution selected from the group consisting of phosphoric acid, sulfuric acid and oxalic acid.

13. The method according to claim 9, wherein the forming of the first dielectric layer includes anodizing the first dielectric layer with at least one electrolyte solution selected from citric acid and boric acid.

14. The method according to claim 9, wherein the forming of the first oxidized film further includes forming a concavo-convex structure in a surface of the aluminum film.

15. The method according to claim 9, further comprising: forming a second oxidized film having a plurality of pores in its surface by performing a first anodizing process on the metal layer; forming a second dielectric layer in which a part of each pore of the second oxidized film is filled with aluminum oxide by performing a second anodizing process on the metal layer on which the second oxidized film is formed; and forming an electrode on the second dielectric layer.

16. The method according to claim 9, wherein the forming of the first oxidized film and the forming of the first dielectric layer are performed to form an oxidized film and a dielectric layer on both surfaces of the aluminum film by being dipped in an electrolyte solution.

17. A method of manufacturing a capacitor, comprising: forming a first electrode including aluminum; selectively applying a first electrolyte and voltage to a portion of the first electrode to form an oxide layer defining a plurality of pores and partitions thereon in alternating relation; selectively applying a second electrolyte and voltage to the portion of the first electrode to thicken the oxide layer thereof according to a predetermined electrical characteristic for the capacitor; applying a second electrode to be in contact with the partitions; and interposing a first dielectric layer between the first electrode and the second electrode, the first dielectric layer including a dense layer contacting the first electrode on a side facing the second electrode and a porous layer disposed between the dense layer and the second electrode and including the plurality of pores, the porous layer having a density lower than that of the dense layer.

18. The method according to claim 17, further comprising adaptively adjusting the second voltage or a current or a temperature or an application time of the second electrolyte, or a combination thereof to establish a predetermined thickness of a bottom wall of the plurality of pores.

19. The capacitor according to claim 1, wherein the dielectric layer and the first electrode are directly coupled together without adhesive.

20. The capacitor according to claim 1, further comprising a base substrate including silicon coupled to the first electrode.

* * * * *